(12) United States Patent
Nishiyama (10) Patent No.: US 10,554,828 B2
(45) Date of Patent: Feb. 4, 2020

(54) COMMUNICATION APPARATUS PROVIDING TRANSMISSION DESTINATION FROM AN ADDRESS BOOK, CONTROL METHOD THEREOF, AND STORAGE MEDIUM

(71) Applicant: CANON KABUSHIKI KAISHA, Tokyo (JP)

(72) Inventor: Masashi Nishiyama, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/143,877

(22) Filed: Sep. 27, 2018

(65) Prior Publication Data

US 2019/0109952 A1 Apr. 11, 2019

(30) Foreign Application Priority Data

Oct. 5, 2017 (JP) ................................ 2017-195379

(51) Int. Cl.
*H04N 1/00* (2006.01)
*H04L 29/12* (2006.01)

(52) U.S. Cl.
CPC ..... *H04N 1/00209* (2013.01); *H04N 1/00241* (2013.01); *H04L 61/1523* (2013.01); *H04N 2201/0094* (2013.01)

(58) Field of Classification Search
None
See application file for complete search history.

(56) References Cited

U.S. PATENT DOCUMENTS

| 9,397,963 B2 * | 7/2016 | Jordan, Jr. ............. G06Q 10/10 |
| 2002/0159807 A1 * | 10/2002 | Ishida .................. G06Q 10/087 400/76 |
| 2003/0065786 A1 * | 4/2003 | Park .................. H04L 29/12009 709/227 |
| 2006/0168344 A1 * | 7/2006 | Tsuchiya ................ G06Q 10/10 709/245 |
| 2007/0130135 A1 * | 6/2007 | Hagiuda ................... G06F 3/12 |

(Continued)

FOREIGN PATENT DOCUMENTS

JP 2000-174800 A 6/2000

*Primary Examiner* — Miya J Williams
(74) *Attorney, Agent, or Firm* — Venable LLP (57) ABSTRACT

A communication apparatus communicates with an external apparatus, and executes instructions to set, as a transmission destination, at least one of first transmission destinations included in a first address book stored on the communication apparatus and second transmission destinations included in a second address book stored on the external apparatus, display detail information of the set transmission destination, and receive an instruction via a registration button to register the transmission destination in the first address book, when at least one of the second transmission destinations is set as the transmission destination and the set transmission destination is usable in the communication apparatus. According to the received instruction, the set transmission destination is registered in the first address book, and electronic data is transmitted to the set transmission destination. When the set transmission destination is unusable in the communication apparatus, registration using the registration button is not performed.

17 Claims, 8 Drawing Sheets

(56) References Cited

U.S. PATENT DOCUMENTS

| | | | | |
|---|---|---|---|---|
| 2007/0146786 A1* | 6/2007 | Nakamura | ........... | H04N 1/4406 |
| | | | | 358/1.16 |
| 2008/0047020 A1* | 2/2008 | Masui | ................ | H04N 1/00209 |
| | | | | 726/26 |
| 2008/0144120 A1* | 6/2008 | Katahira | .............. | H04N 1/0035 |
| | | | | 358/401 |
| 2010/0198854 A1* | 8/2010 | Chitturi | ................ | G06F 16/951 |
| | | | | 707/760 |
| 2010/0332624 A1* | 12/2010 | Terao | .................... | G06F 21/608 |
| | | | | 709/220 |
| 2011/0122435 A1 | 5/2011 | Nishiyama | | |
| 2011/0271324 A1* | 11/2011 | Ikeda | ................... | H04L 67/306 |
| | | | | 726/3 |
| 2016/0044186 A1* | 2/2016 | Inoue | ................ | H04N 1/00209 |
| | | | | 358/1.15 |
| 2018/0160002 A1 | 6/2018 | Nishiyama | | |

* cited by examiner

DETAIL INFORMATION — 701

| PATH | \\david_server@yyy | — 704 |
| USER NAME | guest | — 705 |
| PASSWORD | ******* | — 706 |

REGISTER IN ADDRESS BOOK — 702

COMMUNICATION APPARATUS PROVIDING TRANSMISSION DESTINATION FROM AN ADDRESS BOOK, CONTROL METHOD THEREOF, AND STORAGE MEDIUM

BACKGROUND OF THE INVENTION

Field of the Invention

The present invention relates to a communication apparatus that uses a transmission destination obtained by referring to an address book in a different apparatus on the network as a transmission destination of electronic data, a method of controlling the same, and a storage medium.

Description of the Related Art

Conventionally, multifunction peripherals with communication capability commonly transmit scanned documents in the form of electronic files. In such a multifunction peripheral, transmission destinations for transmitting documents are registered in advance in an address book from which a transmission destination can be designated. For example, Japanese Patent Laid-Open No. 2000-174800 proposes a technology for, in an electronic mail system, referring not only to electronic mail addresses stored on a local machine but also to electronic mail addresses stored on other machines on the network. Also known is a technology in which the roles of a server and a client are assigned to two multifunction peripherals connected to a network so that the multifunction peripheral serving as the client may refer to the address book publicized by the multifunction peripheral serving as the server. In these technologies, the multifunction peripheral serving as the client can refer to and use the address book of the multifunction peripheral serving as the server to designate a transmission destination from the address book when transmitting a document.

The foregoing technologies, however, have the problems described below. For example, according to the foregoing technologies, it is not possible for the client multifunction periphery to register transmission destinations designated in the address book of the server multifunction periphery in its address book. Therefore, to reuse a transmission destination designated in the address book of the server multifunction periphery, the client multifunction periphery is required to reestablish communication with the server and acquire the destination again. If communication with the server multifunction periphery is a time-consuming task, the time and effort for that will not be negligible. Furthermore, if the administrator of the address book of the server relocates the transmission destinations in the server's address book, it will become necessary to spend time and effort to locate these destinations, placing a considerable burden on the user.

SUMMARY OF THE INVENTION

The present invention enables realization of a mechanism to allow a communication apparatus that uses a transmission destination obtained by referring to an address book in a different apparatus on a network as a transmission destination of electronic data (predetermined information) to register the obtained transmission destination in an address book of the communication apparatus.

One aspect of the invention provides a communication apparatus capable of communicating with an external apparatus, comprising: a memory device that stores a set of instructions; and at least one processor that executes the set of instructions to: set, as a transmission destination, at least one of first transmission destinations included in a first address book stored on the communication apparatus and second transmission destinations included in a second address book stored on the external apparatus; transmit electronic data to the set transmission destination; and register, in a case where at least one of the second transmission destinations is set as the transmission destination, in the first address book of the communication apparatus the set second transmission destination that is to be used for the transmission of the electronic data.

Another aspect of the invention provides a method for controlling a communication apparatus capable of communicating with an external apparatus, the method comprising: setting, as a transmission destination, at least one of first transmission destinations included in a first address book stored on the communication apparatus and second transmission destinations included in a second address book stored on the external apparatus; transmitting electronic data to the set transmission destination; and registering, in a case where at least one of the second transmission destinations is set as the transmission destination, in the first address book of the communication apparatus the set second transmission destination that is to be used in the transmitting.

Still another aspect of the invention provides a non-transitory computer-readable storage medium storing a computer program for causing a computer to perform a method for controlling a communication apparatus capable of communicating with an external apparatus, the method comprising: setting, as a transmission destination, at least one of first transmission destinations included in a first address book stored on the communication apparatus and second transmission destinations included in a second address book stored on the external apparatus; transmitting electronic data to a transmission destination set in the setting; and registering, in a case where at least one of the second transmission destinations is set as the transmission destination, in the first address book of the communication apparatus the set second transmission destination that is to be used in the transmitting.

Further features of the present invention will be apparent from the following description of exemplary embodiments with reference to the attached drawings.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

System Configuration

Figure 1:
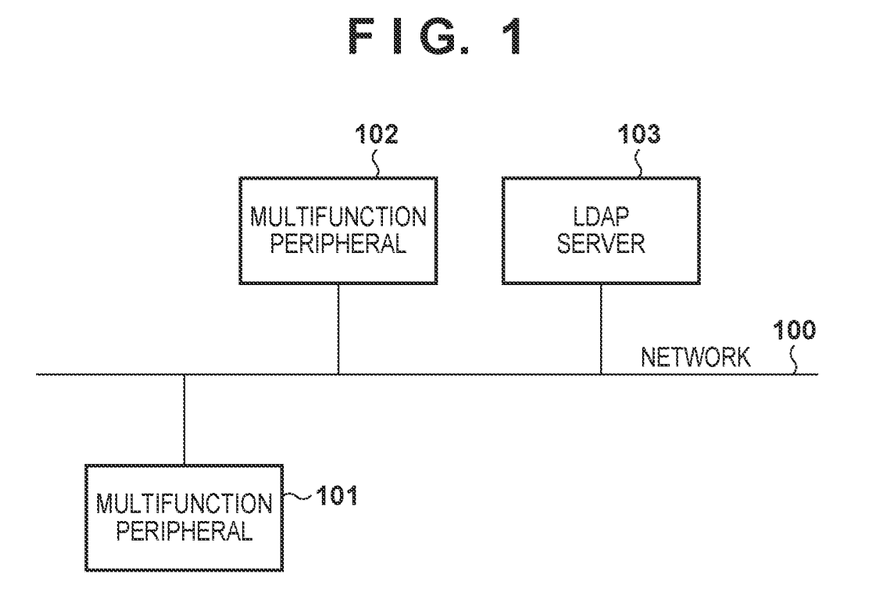
FIG. 1 is a system configuration diagram according to an embodiment of the present invention.

A first embodiment of the present invention will be described hereinafter. First, a network system according to this embodiment will be described with reference to FIG. 1. FIG. 1 shows a network system in which a plurality of multifunction peripherals are connected to a network with a multifunction peripheral 101 and a multifunction peripheral 102 connected to each other via a network 100.

The multifunction peripheral 101 according to this embodiment is capable of optically reading a paper document, converting it to electronic data (predetermined information), and transmitting it as an electronic mail to a transmission destination. In addition, the multifunction peripheral 101 is provided with various transmission functions, such as fax, Internet fax, and transmission to folders of file servers. Moreover, the multifunction peripheral 101 is also capable of referring to and obtaining via the network 100 the address book data registered in the multifunction peripheral 102, which functions as a server, to use it for transmission of documents ("electronic data"). In other words, the multifunction peripheral 101 is also capable of functioning as a client that uses the address book of the multifunction peripheral 102.

On the other hand, the multifunction peripheral 102 is an example of a first external apparatus that can publicize the address book registered in an HDD 116 (FIG. 2), which will be described below, to the multifunction peripheral 101 and other network devices via the network 100. In other words, the multifunction peripheral 102 is capable of functioning as an address management server.

Furthermore, the multifunction peripheral 101 is also capable of referring to the address book data registered in an LDAP (Lightweight Directory Access Protocol) server 103 via the network 100 and using that data to transmit electronic data. Although the multifunction peripheral 101 and the multifunction peripheral 102 are capable of performing other functions, such as photocopying of paper documents, in addition to the above-described functions, a description thereof is omitted as these functions are not directly related to the present invention. It should be noted that while the multifunction peripherals of this embodiment are described merely as exemplary communication apparatuses, the present invention can be applied to communication apparatuses other than multifunction peripherals, such as scanners, fax machines, copying machines, and printers, and also to personal computers, mobile terminals, etc.

Hardware Configuration of Multifunction Peripherals

Figure 2:
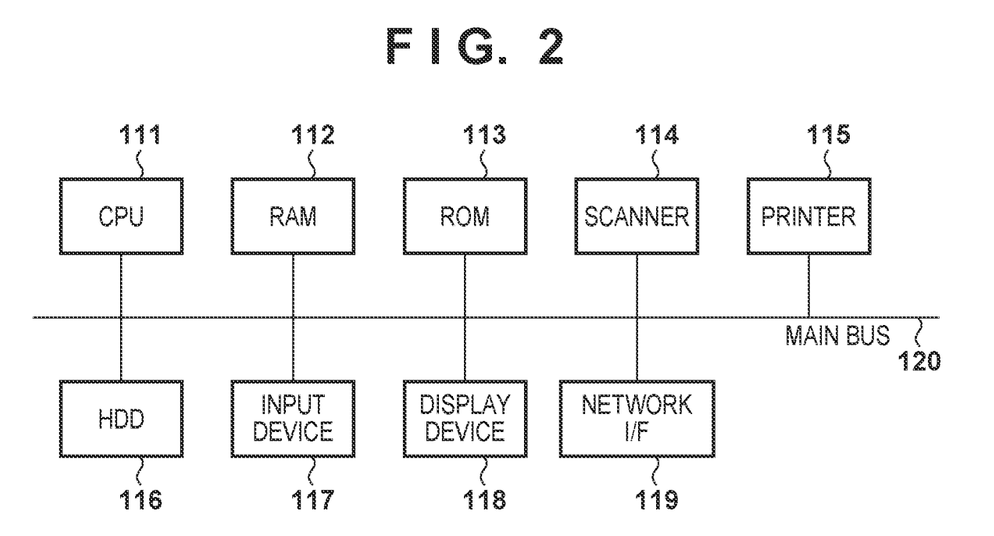
FIG. 2 is a hardware configuration diagram according to the embodiment.

Next, one example of the hardware configuration of the multifunction peripherals 101 and 102 shown in FIG. 1 will be described hereinafter with reference to FIG. 2. Each of the multifunction peripherals includes the configuration shown in FIG. 2.

The CPU 111 controls the multifunction peripheral 101, 102. The RAM (random access memory) 112 provides a work area for the CPU 111. The ROM 113 stores the programs for executing the processes that will be described below in this embodiment. The HDD (hard disk drive) 116 stores the various settings of the address book data, etc., which will be described below. In addition, the input device 117 is provided to allow users (including those who use it and the installer) to enter commands. The display device 118 is an exemplary display unit that provides screen display. The network interface (referred to as the "network IF" hereinafter) 119 communicates with other devices via the network. The hardware configuration also includes a main bus 120.

In addition, the multifunction peripheral 101 has a scanner 114 for optically reading a manuscript and converting it to electronic data, and a printer 115 for printing image data. It should be noted that, unless otherwise specified, in each of the multifunction peripherals 101 and 102, the CPU 111 exercises centralized control over the RAM 112, the HDD 116, the input device 117, the display device 118, and the network IF 119 via the main bus 120.

Software Configuration of Multifunction Peripherals

Figure 3:
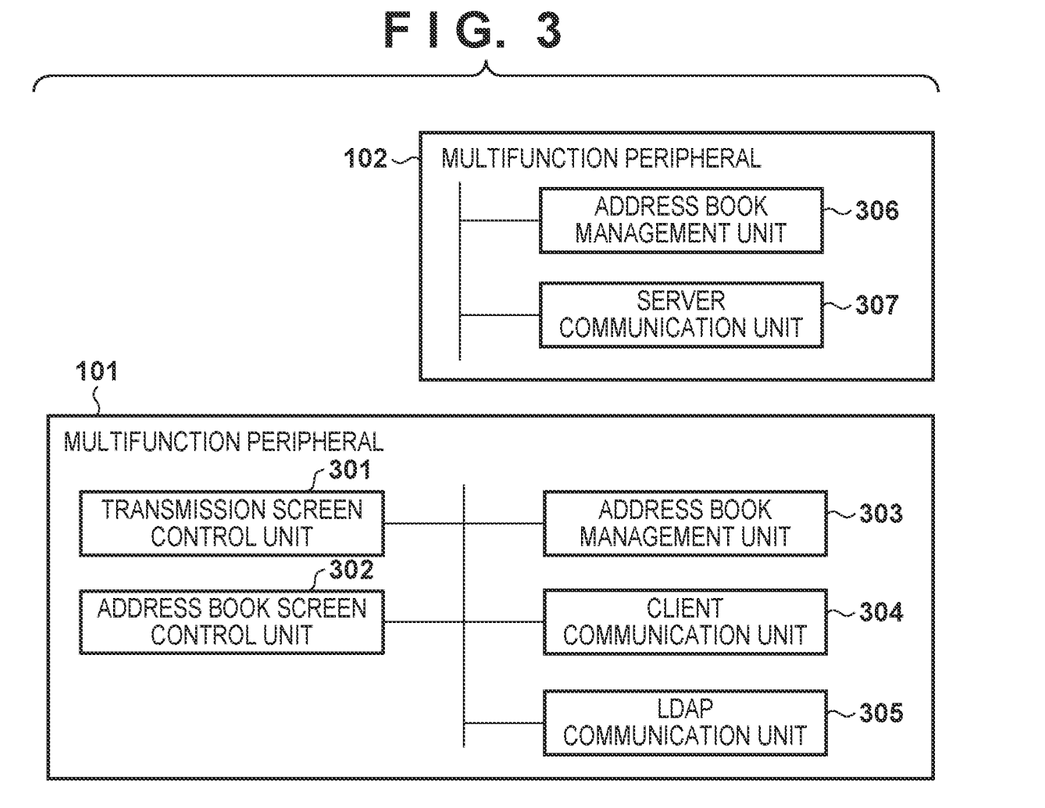
FIG. 3 is a software configuration diagram according to an embodiment.

Next, the software configuration of the multifunction peripherals 101 and 102 will be described with reference to FIG. 3. It should be noted that, unless otherwise specified, each of the functional units shown in FIG. 3 is implemented by the CPU 111 exercising centralized control over the RAM 112, the HDD 116, the input device 117, the display device 118, and the network IF 119 via the main bus 120.

The multifunction peripheral 101 includes, as a software configuration, a transmission screen control unit 301, an address book screen control unit 302, an address book management unit 303, a client communication unit 304, and an LDAP communication unit 305. The transmission screen control unit 301 controls a transmission screen, which will be described below. The address book screen control unit 302 controls address book screens, which will also be described below.

The address book management unit 303 manages address book data that includes transmission destinations ("first transmission destinations") and stores entered address book data on the HDD 116 of the multifunction peripheral 101 based on a registration instruction received from the address book screen control unit 302. Moreover, the address book management unit 303 reads out address book data stored on the HDD 116 of the multifunction peripheral 101 based on a reference instruction from the address book screen control unit 302 and returns the address book data as a reply.

The client communication unit 304 refers to and obtains address book data registered in the multifunction peripheral 102, which functions as an address book management server, based on an instruction from the address book screen control unit 302. The LDAP communication unit 305 refers to and obtains address book data registered in the LDAP server 103 based on an instruction from the address book screen control unit 302.

The multifunction peripheral 102 includes, as a software configuration, an address book management unit 306 and a server communication unit 307. The address book management unit 306 manages address book data including transmission destinations ("second transmission destinations"), reads out address book data stored on the HDD 116 based on a reference instruction from the server communication unit 307, which will be described below, and returns the address book data as a reply. The server communication unit 307 refers to address book data of the address book management unit 306 in response to a request to refer to the address book data from the network (for example, from the multifunction peripheral 101) and returns the address book data as a reply.

Initial Screen

Figure 4:
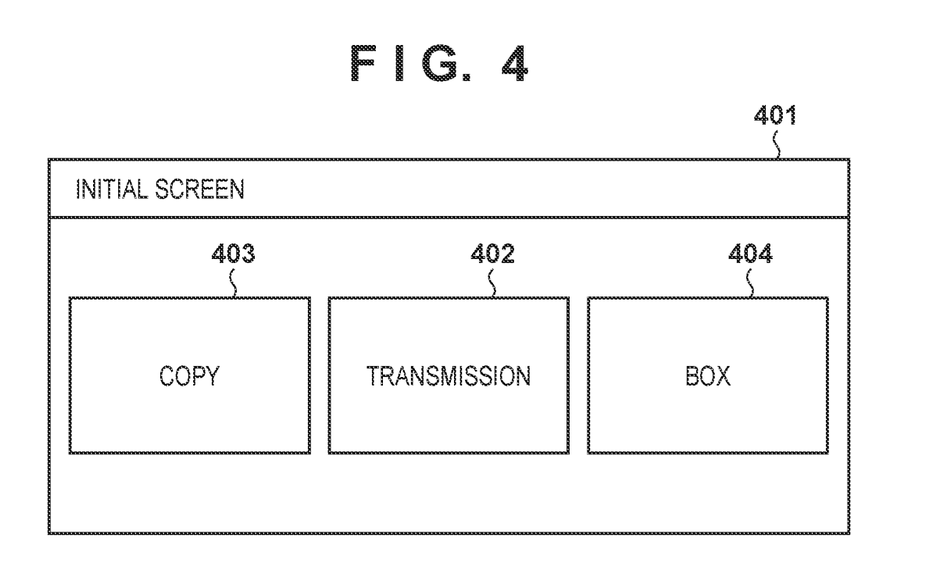
FIG. 4 is a view showing an exemplary screen according to an embodiment.

Next, the initial screen displayed on the multifunction peripheral 101 upon startup will be described with reference to FIG. 4. The initial screen 401 is a user interface for receiving user inputs and is displayed on the display device 118 by the CPU 111. Buttons 402, 403, and 404 for performing the various provided services are arranged on the initial screen 401. When the transmission button 402 is pressed by the user, the CPU 111 displays the transmission screen 501 shown in FIG. 5. As used herein, the term "transmission" refers to the service to transmit image data to external apparatuses. This may be image data read from a manuscript by the scanner 114 or may also be image data stored on the HDD 116, etc.

Transmission Screen

Figure 5:
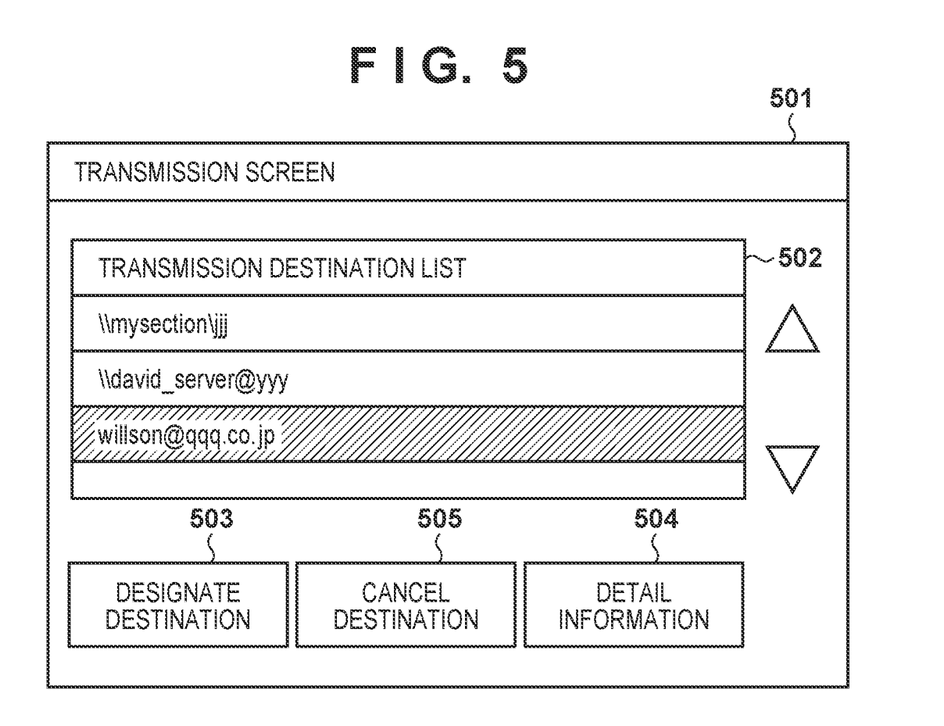
FIG. 5 is a view showing another exemplary screen according to an embodiment.

Next, the transmission screen for transmitting a document generated by scanning on the multifunction peripheral 101 ("electronic data") will be described with reference to FIG. 5. The transmission screen 501, which is one example of a setting screen for receiving user inputs, is controlled by the transmission screen control unit 301 and displayed on the display device 118. The transmission screen 501 includes a transmission destination list field 502, a destination designation button 503, a destination cancel button 505, and a detail information button 504.

Figure 6:
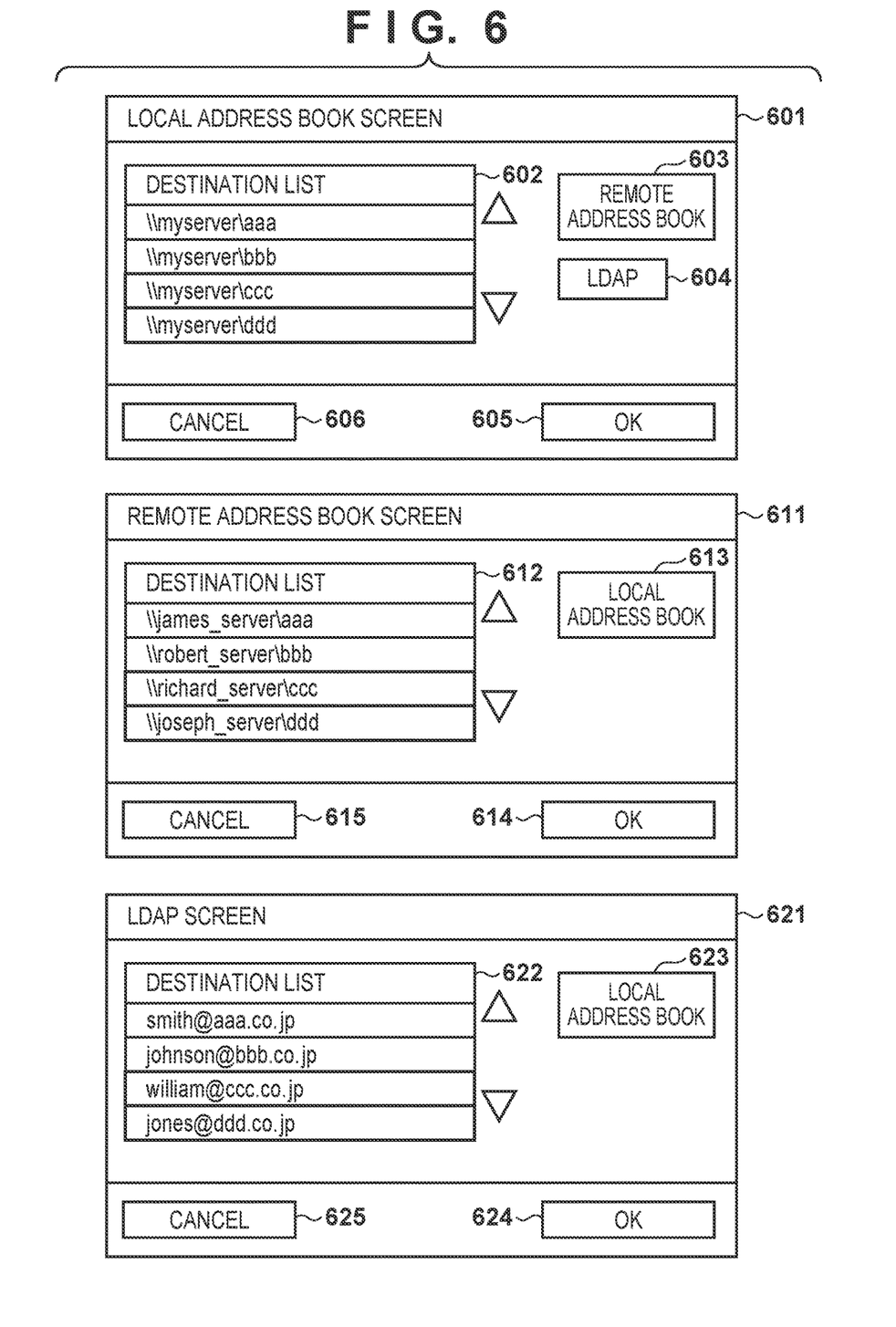
FIG. 6 is a view showing exemplary screens according to an embodiment.

When the destination designation button 503 is pressed by the user, the transmission screen control unit 301 displays one of the address book screens shown in FIG. 6. Thereafter, the destination selected by the user from the address book screen displayed may be designed in the transmission destination list field 502.

The transmission destination list field 502 is a field for selectably displaying transmission destinations that have already been set therein. When the transmission destination list field 502 is pressed (i.e., selected) by the user, the transmission screen control unit 301 highlights and makes the pressed transmission destination selected. When the destination cancel button 505 is pressed by the user with a destination selected, the transmission screen control unit 301 deletes this destination from the transmission destination list field 502. When the detail information button 504 is pressed by the user with a destination selected in the above-described manner, the transmission screen control unit 301 displays the detail information screen shown in FIG. 7. Although not shown in this embodiment, by pressing the start button provided on the input device 117, the user can issue an instruction to transmit a document, whereupon the CPU 111 starts a process to transmit the electronic data to transmission destinations set in the transmission destination list field 502. In other words, the multifunction peripheral 101 can set a plurality of transmission destinations as destinations to which electronic data are to be transmitted.

Address Book Screens

Next, the address book screens 601, 611 and 621, which are exemplary setting screens to receive user inputs for designating a destination as a transmission destination in the multifunction peripheral 101, will be described with reference to FIG. 6. The local address book screen 601 is controlled by the address book screen control unit 302 and displayed on the display device 118 of the multifunction peripherals 101. The local address book screen 601 includes a destination list field 602, a remote address book button 603, an LDAP button 604, an OK button 605, and a cancel button 606.

When the user presses any of the plurality of destinations displayed in the destination list field 602, the address book screen control unit 302 highlights and makes the pressed destination selected. When the OK button 605 is pressed by the user with a destination selected in the above-described manner, the address book screen control unit 302 selects that destination and displays the transmission screen 501 again. At this moment, the transmission screen control unit 301 adds the destination selected on the destination list field 602 to the transmission destination list field 502 as a transmission destination. On the other hand, if the cancel button 606 is pressed, no destination is selected to return to the transmission screen 501.

When the remote address book button 603 is pressed by the user, the address book screen control unit 302 displays the remote address book screen 611 on the display device 118. Additionally, when the LDAP button 604 is pressed by the user, the address book screen control unit 302 displays the LDAP screen 621 on the display device 118.

The remote address book screen 611 is controlled by the address book screen control unit 302 and displayed on the display device 118. The remote address book screen 611 includes a destination list field 612, a local address book button 613, an OK button 614, and a cancel button 615. As the client communication unit 304 refers to and obtains the address book data registered in the multifunction periphery 102, which functions as an address book management server, one or more destinations obtained from the multifunction periphery 102 are displayed in the destination list field 612. When the local address book button 613 is pressed by the user, the address book screen control unit 302 displays the transmission screen 601 again. When the OK button 614 is pressed by the user, the address book screen control unit 302 displays the transmission screen 501 again. At this moment, the transmission screen control unit 301 adds the destination selected on the destination list field 612 to the transmission destination list field 502 as a transmission destination. On the other hand, if the cancel button 615 is pressed, no destination is selected to return to the transmission screen 501.

The LDAP screen 621 is controlled by the address book screen control unit 302 and displayed on the display device 118. The LDAP screen 621 includes a destination list field 622, a local address book button 623, an OK button 624, and a cancel button 625. As the LDAP communication unit 305 refers to the address book data registered in the LDAP server 103, those destinations are displayed in the destination list field 622. When the local address book button 623 is pressed by the user, the address book screen control unit 302 displays the transmission screen 601 again. When the OK button 624 is pressed by the user, the address book screen control unit 302 displays the transmission screen 501 again. At this moment, the transmission screen control unit 301 adds the destination selected on the destination list field 622 to the transmission destination list field 502 as a transmission destination. On the other hand, if the cancel button 625 is pressed, no destination is selected to return to the transmission screen 501.

Detail Information Screen

Figure 7:
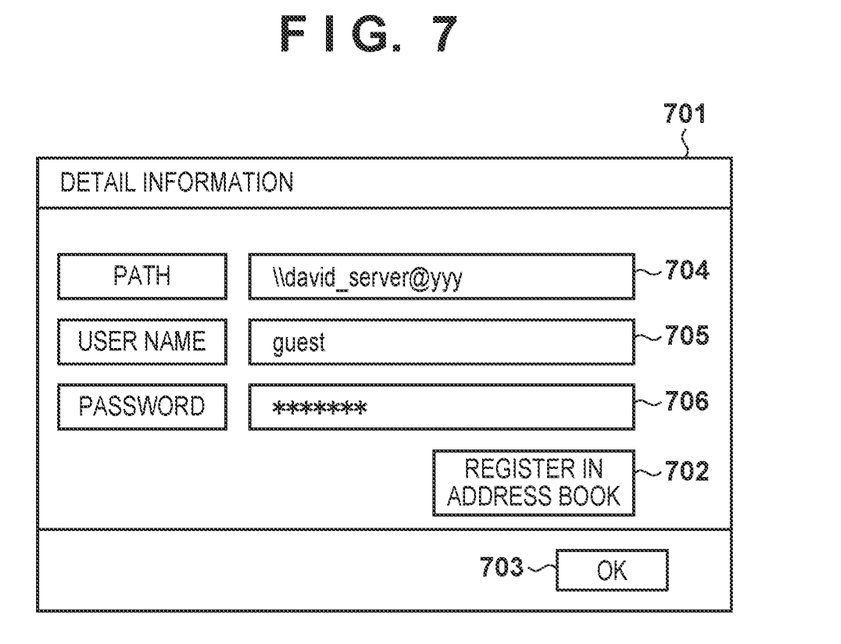
FIG. 7 is a view showing still another exemplary screen according to an embodiment.

Next, a detail screen for displaying on the multifunction peripherals 101 detail information of a transmission destination displayed in the transmission destination list field 502 will be described with reference to FIG. 7. The detail information screen 701 is controlled by the address book screen control unit 302 and displayed on the display device 118. The detail information screen 701 includes a registerin-address book button 702, an OK button 703, a path setting field 704, a user name setting field 705, and a password setting field 706.

The register-in-address book button 702 is a button for registering the transmission destination whose detail information is displayed ("second transmission destination") in the address book management unit 303. The register-in-address book button 702 may be controlled to be hidden from view if the transmission destination is a destination unusable on the multifunction peripheral 101. This prevents transmission destinations that are unusable on the multifunction peripheral 101 from being managed, thus allowing for efficient use of the memory and other resources. The path setting field 704, the user name setting field 705, and the password setting field 706 are provided for setting a path, a user name, and a password, respectively.

When the register-in-address book button 702 is pressed by the user, the address book screen control unit 302 registers in the local address book the data that is set in the setting fields 704-706. When the OK button 703 is pressed by the user, the address book screen control unit 302 displays the transmission screen 501 again.

Table A shows the data configurations of the address books maintained by the address book management unit 303 of the multifunction peripheral 101 and the address book management unit 306 of the multifunction peripheral 102.

TABLE A

Table A - Configurations of Data Stored in Address Books

| Types of Transmission | Parameters | Default Values |
|---|---|---|
| Email | Email Address | Blank |
|  | Via SMTP Server | ON |
| Fax | Fax number | Blank |
|  | Line Used for Transmission | Auto |
| Internet Fax | Internet Fax Address | Blank |
|  | Color Transmission | OFF |
| File Server | Server Path | Blank |
|  | User Name | Blank |
|  | Password | Blank |

The parameters that compose a destination are different for each transmission type. The transmission types include, for example, electronic mail (email), fax, Internet fax, and file server. Additionally, the default value is different for each parameter. An "email" destination includes "email address" and "via SMTP server" parameters. The default value of the "Via SMTP server" parameter is "ON." Accordingly, emails are transmitted via a SMTP (Simple Mail Transfer Protocol) server by default. This parameter can be used to determine, for each transmission destination, whether or not to perform that transmission via the SMTP server.

A "fax" destination includes "fax number" and "line used for transmission" parameters. As the multifunction peripheral 101 and the multifunction peripheral 102 are capable of having a plurality of lines for fax transmission, it is possible to designate which line to use for each transmission destination. The default value for the "line used for transmission" parameter is "auto" so that, by default, any available line during fax transmission is automatically used.

An "Internet fax" destination includes "Internet fax address" and "color transmission" parameters. The default value for the "color transmission" parameter is "OFF" so that Internet fax transmission is by default black-and-white. A "file server" destination includes "server path," "user name," and "password" parameters. As described above, the multifunction peripheral 102 is an example of a first external apparatus capable of managing all transmission types, that is, the transmission types that correspond at least to the transmission destinations of emails, fax, Internet fax, and file servers.

TABLE B

Table B - Configuration of LDAP Stored Data

| Types of Transmission | Data Description |
|---|---|
| Email | Email Address |
| Fax | Fax Number |

Table B shows the data configuration of the address book maintained by the LDAP server 103. The LDAP server 103 has the function as a general directory server and manages information about emails and fax, which are the transmission types performed by this server. An "email" destination has an "email address" as its only parameter. A "fax" destination has a "fax number" as its only parameter. In this way, the LDAP server 103 does not manage destinations of Internet fax or file servers. Therefore, the LDAP server 103 is an example of a second external apparatus and is capable of managing certain transmission types, that is, the transmission types of correspond to the transmission destinations of emails and fax. That is, the multifunction peripheral 101 cannot handle the transmissions types of "Internet fax" or "file server" simply by making it possible to register the addresses managed only by the LDAP server 103 as remote addresses.

Transmission Process

Figure 8A:
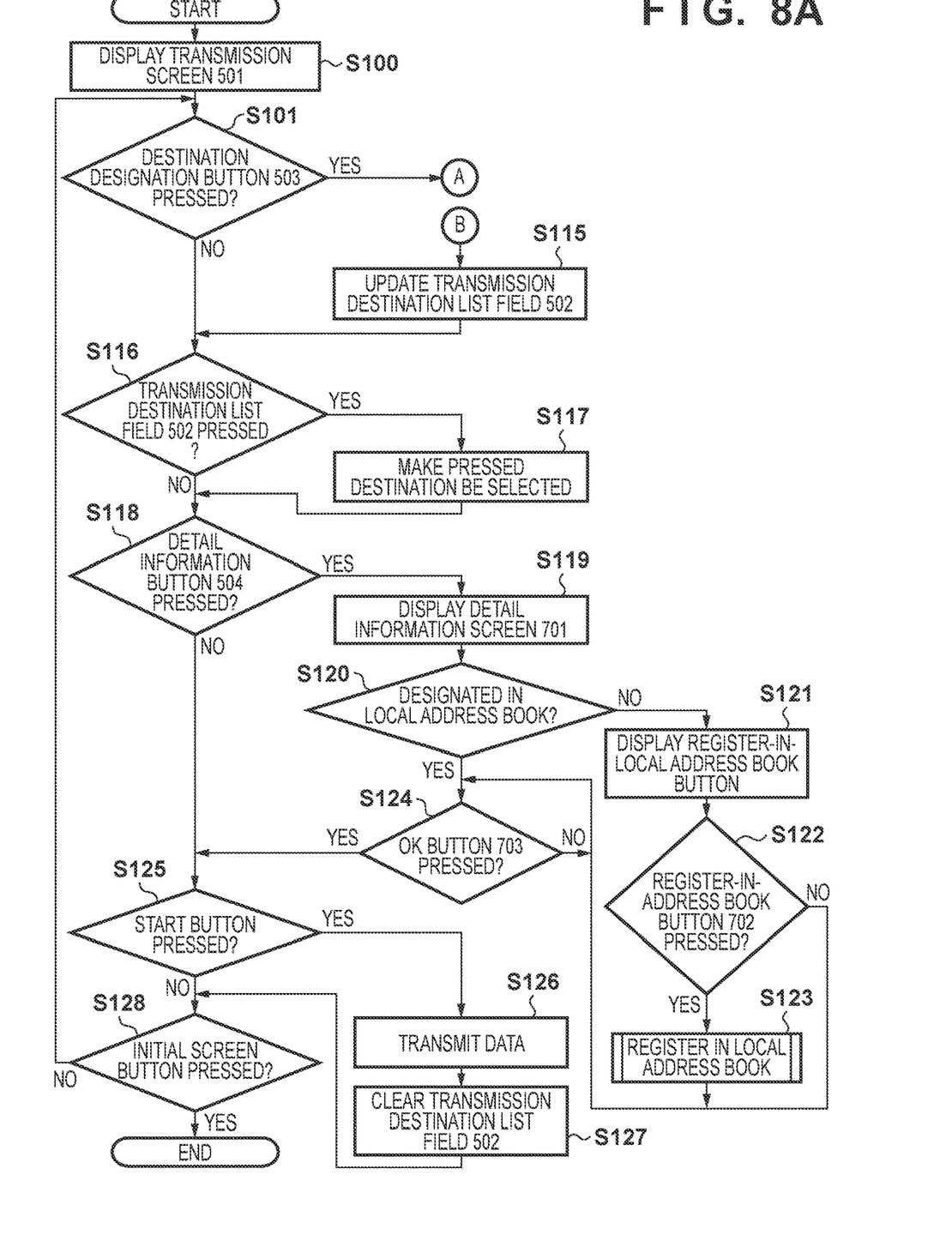
FIGS. 8A and 8B are flowcharts showing a procedure for a transmission process in a communication apparatus according to an embodiment.
Figure 8B:
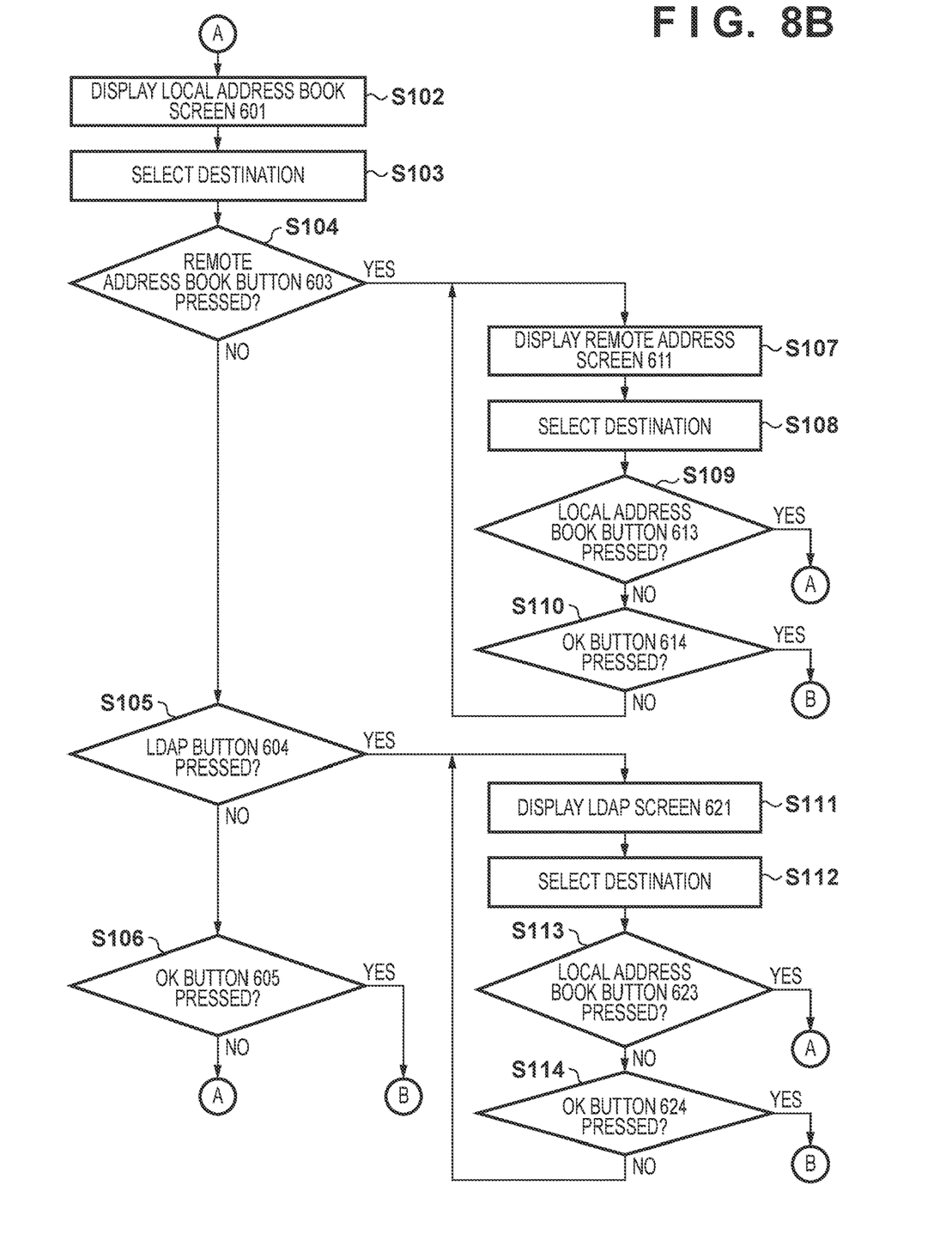

The following describes the procedure followed by the multifunction peripheral 101 when performing transmission with the transmission screen 501 displayed thereon with reference to FIGS. 8A and 8B. It should be noted that the program for performing the process shown in the flowchart is stored, for example, on the ROM 113 and read out by CPU 111 into the RAM 112 for execution.

Initially, in Step S100, upon detecting that the transmission button 402 has been pressed, the transmission screen control unit 301 causes the display device 118 of the multifunction peripheral 101 to display the transmission screen 501. Next, in Step S101, the transmission screen control unit 301 determines whether or not pressing of the destination designation button 503 by the user is detected. If pressing of the button is detected, the process proceeds to Step S102 and, if not, proceeds to Step S116.

Next, in Step S102, the address book screen control unit 302 displays the local address book screen 601 on the display device 118 of the multifunction peripheral 101. Subsequently, in Step S103, in response to the pressing of the destination list field 602 by the user, the address book screen control unit 302 makes a destination be selected. In Step S104, the address book screen control unit 302 determines whether or not pressing of the remote address book button 603 ("first button") by the user is detected and, if it is detected, proceeds to Step S107. Conversely, if it is not detected, the process proceeds to Step S105. In Step S105, the address book screen control unit 302 determines whether or not pressing of the LDAP button 604 ("second button") by the user is detected and, if it is detected, proceeds to Step S111. Conversely, if it is not detected, the process proceeds to Step S106. In Step S106, the address book screen control unit 302 determines whether or not pressing of the OK button 605 by the user is detected and, if it is detected, proceeds to Step S115. Conversely, if it is not detected, the process returns to Step S102.

Then, in Step S107, the address book screen control unit 302 displays the remote address screen 611 on the display device 118 of the multifunction peripheral 101. In this step, as described above, as the client communication unit 304 refers to and obtains the address book data registered in the multifunction periphery 102, one or more destinations obtained from the multifunction periphery 102 are displayed in the destination list field 612. Subsequently, in Step S108, in response to the pressing of the destination list field 612 by the user, the address book screen control unit 302 makes a destination be selected. Furthermore, in Step S109, the address book screen control unit 302 determines whether or not pressing of the local address book button 613 is detected and, if it is detected, proceeds to Step S102. Conversely, if it is not detected, the process proceeds to Step S110. In Step S110, the address book screen control unit 302 determines whether or not pressing of the OK button 614 is detected and, if it is detected, proceeds to Step S115. Conversely, if it is not detected, the process returns to Step S107.

Then, in Step S111, the address book screen control unit 302 displays the LDAP screen 621 on the display device 118 of the multifunction peripheral 101. Subsequently, in Step S112, in response to the pressing of the destination list field 622 by the user, the address book screen control unit 302 makes a destination be selected. Furthermore, in Step S113, the address book screen control unit 302 determines whether or not pressing of the local address book button 623 is detected and, if it is detected, proceeds to Step S102. Conversely, if it is not detected, the process proceeds to Step S114. In Step S114, the address book screen control unit 302 determines whether or not pressing of the OK button 624 is detected and, if it is detected, proceeds to Step S115. Conversely, if it is not detected, the process returns to Step S111.

In Step S115, the transmission screen control unit 301 adds the destination selected in Steps S103, S108, or S112 to the transmission destination list field 502 and shows the selected destination thereon to update the transmission screen 501. In Step S116, the transmission screen control unit 301 determines whether or not pressing of the transmission destination list field 502 by the user is detected and, if it is detected, proceeds to Step S117. Conversely, if it is not detected, the process proceeds to Step S118. In Step S117, the transmission screen control unit 301 makes the pressed destination selected and proceeds to Step S118.

In Step S118, the transmission screen control unit 301 determines whether or not pressing of the detail information button 504 is detected and, if it is detected, proceeds to Step S119. Conversely, if it is not detected, the process proceeds to Step S125. Then, in Step S119, the address book screen control unit 302 displays the detail information screen 701 on the display device 118 of the multifunction peripheral 101. Subsequently, in Step S120, the address book screen control unit 302 determines whether or not the destination whose detail information is displayed has been designated in the local address book. If the destination has been designated in the local address book, the process proceeds to Step S124. Meanwhile, if the destination has not been designated in the local address book, that is, if it has been designated in the remote address book screen 611 or the LDAP screen 621, the process proceeds to Step S121.

In Step S121, the address book screen control unit 302 displays the detail information screen 701 including the register-in-local address book button 702. Next, in Step S122, the address book screen control unit 302 determines whether or not pressing of the register-in-address book button 702 is detected and, if it is detected, proceeds to Step S123. Conversely, if it is not detected, the process proceeds to Step S124. In Step S123, the address book screen control unit 302 registers the destination in the local address book and proceeds to Step S124. A more detailed description of the registration of a destination in the local address book will be provided below with reference to FIG. 9.

In Step S124, the address book screen control unit 302 determines whether or not pressing of the OK button 703 by the user is detected and, if it is detected, proceeds to Step S125. Conversely, if it is not detected, the determination in Step S124 is repeated. In Step S125, the transmission screen control unit 301 determines whether or not pressing of the start button (not shown) by the user is detected and, if it is detected, proceeds to Step S126. Conversely, if it is not detected, the process proceeds to Step S128.

In Step S126, the transmission screen control unit 301 starts transmission to the destinations designated in the transmission destination list field 502. Subsequently, in Step S127, the transmission screen control unit 301 clears the transmission destination list field 502 and proceeds to Step S128. In Step S128, the transmission screen control unit 301 determines whether or not pressing of an initial screen button is detected and, if it is detected, passes control to the initial screen 401 and terminates the process of the flowchart. Conversely, if it is not detected, the process returns to Step S101.

As a result of the foregoing process flow, when using a destination registered in the multifunction peripheral 102, which functions as an address book management server, and the LDAP server 103 as a transmission destination, it is possible to register that transmission destination in the local address book for its future use. As a result, when that transmission destination is used next time, as its local address book can be referred to, it is possible to save time and trouble to communicate with, and to refer to, the multifunction peripheral 102 or the LDAP server 103 to obtain the same destination again.

Registration in Local Address Book

Figure 9:
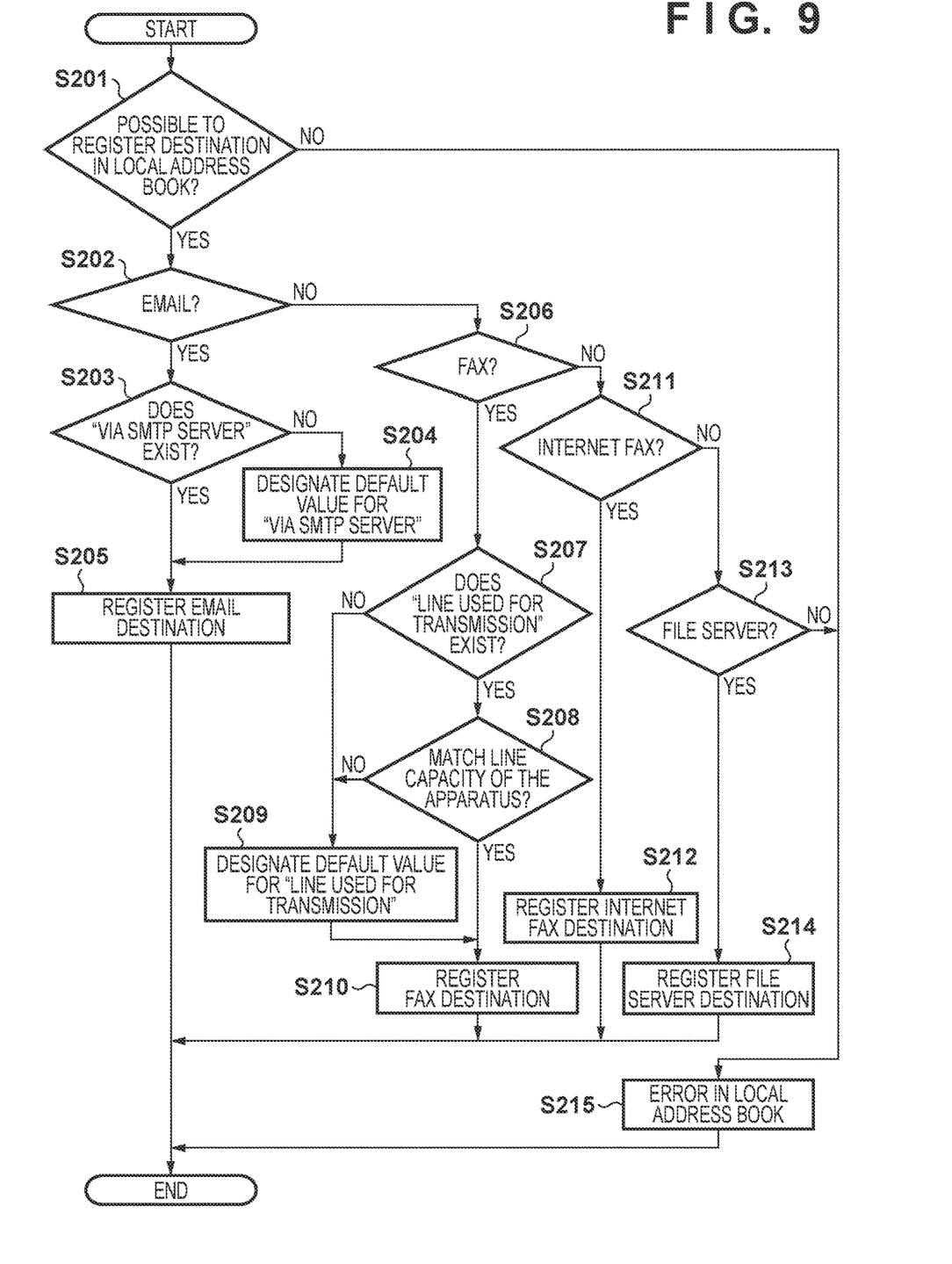
FIG. 9 is a flowchart showing a procedure for a registration process in a communication apparatus according to the embodiment.

Next, the procedure to register the destination in the local address book in S123 in FIG. 8A will be described with reference to FIG. 9. It should be noted that the program for performing the process shown in the flowchart is stored, for example, on the ROM 113 and read out by CPU 111 into the RAM 112 for execution.

Before performing the procedure to register the destination in the local address book, first of all, in Step S201, the address book screen control unit 302 determines whether or not it is possible to register the destination in the local address book. The multifunction peripheral 101 has the function to allow only specific users to register destinations in the local address book. Therefore, some users may not be able to register destinations in the local address book. Accordingly, in this embodiment, the authority of the user that is logged in is checked to determine whether or not the user has the authority to register destinations in the local address book. It should be noted that the specifics of the foregoing authority may be determined depending on the circumstances of the installation of each multifunction periphery. In Step S201, if it is possible to register the destination with the local address book, the process goes on to step S202, and, if not, the process goes on to step S215. While it is determined in this example whether or not the user is authorized to register the destination in all transmission types of destinations, the determination may be made for each transmission type of destinations (emails, fax, Internet fax, and file servers, etc.).

In Step S202, the address book management unit 303 determines whether or not the destination to be registered is an electronic mail address. If it is an email address, the process proceeds to Step S203. Conversely, if it is not an electronic mail address, the process proceeds to Step S206. In Step S203, the address book management unit 303 determines whether or not the electronic mail destination parameter, "via SMTP server," exists. As shown in Table B, this parameter does not exist in the address book data registered in the LDAP server 103. Accordingly, if the destination to be registered in this process is a destination selected in Step S112 from the LDAP screen 621, the result of the determination in Step S203 is NO. On the other hand, as shown in Table A, this parameter exists in the address book data registered in the multifunction peripheral 102. Accordingly, if the destination to be registered in this process is a destination selected in Step S108 from the remote address book screen 611, the result of the determination in Step S203 is YES. If the determination in Step S203 is YES, the process proceeds to Step S205. If the determination is NO, the process proceeds to Step S204. In Step S204, the address book management unit 303 designates the default value "ON" for "via SMTP server" as shown in Table A and proceeds to Step S205. In Step S205, the address book management unit 303 registers the electronic mail destination in the local address book and terminates the process.

In Step S206, the address book management unit 303 determines whether or not the destination to be registered is a fax. If it is a fax, the process proceeds to Step S207. If it is not a fax, the process proceeds to Step S211. In Step S207, the address book management unit 303 determines whether or not the fax destination parameter, "line used for transmission," exists. As shown in Table B, this parameter does not exist in the address book data registered in the LDAP server 103. Accordingly, if the destination was selected in Step S112 from the LDAP screen 621, the result of the determination in Step S207 is NO. On the other hand, as shown in Table A, this parameter exists in the address book data registered in the multifunction peripheral 102. Accordingly, if the destination was selected in Step S108 from the remote address book screen 611, the result of the determination in Step S207 is YES. If the determination in Step S207 is YES, the process proceeds to Step S208. If the determination is NO, the process proceeds to Step S209. In Step S208, the address book management unit 303 determines whether or not the line capacity of the apparatus matches the value of the parameter "line used for transmission" of the fax destination to be registered. If they match, the process proceeds to Step S210. If it is determined in Step S208 that they do not match, the process proceeds to Step S209. In Step S209, the address book management unit 303 designates the default value, "auto," for the value of "line used for transmission." Subsequently, the process proceeds to Step S210. In Step S210, the address book management unit 303 registers the fax destination and terminates the process.

For example, it is assumed that the multifunction peripheral 101 has the transmission capability of a single line and the multifunction peripheral 102 has the transmission capability of a plurality of lines. It is further assumed that a fax destination whose value of "line used for transmission" is "line 4" is registered in the multifunction peripheral 102. Accordingly, even if the multifunction peripheral 101 refers to the fax destination in the remote address book of the multifunction peripheral 102 and registers the destination in the local address book as is, the multifunction peripheral 101 would not be able to use that destination as the multifunction peripheral 101 has only one line. According to this process flow, however, the value for the "line used for transmission" parameter is converted to the default value, "auto," during the registration, the multifunction peripheral 101 can use this destination.

In Step S211, the address book management unit 303 determines whether or not the destination to be registered is an Internet fax. If it is an Internet fax destination, the process proceeds to Step S212. If it is not, the process proceeds to Step S213. In Step S212, the address book management unit 303 registers the Internet fax destination and terminates the process.

In Step S213, the address book management unit 303 determines whether or not the destination to be registered is a file server. If it is a file server, the process proceeds to Step S214. If it is not, the process proceeds to Step S215. In Step S214, the address book management unit 303 registers the file server destination and terminates the process.

Then, in Step S215, the address book screen control unit 302 restricts the registration of the transmission destination, displays an error screen that indicates a registration error in the local address book on the display device 118 of the multifunction peripheral 101, and terminates the process.

As described above, according to this flowchart, even if there is a destination that cannot be used in the other multifunction peripheral due to the difference in transmission capability, that destination can be used by changing a parameter when registering it in the location address book. Even when referring to and registering address book data with a different data configuration, such as that of an LDAP server, in the local address book, that destination can be used by storing lacking parameters as required and registering that destination.

As described above, the communication apparatus according to this embodiment sets at least one of first transmission destinations included in a first address book stored on the communication apparatus and second transmission destinations included in a second address book stored on the external apparatus as a transmission destination. In addition, the communication apparatus transmits electronic data to the set transmission destination, and registers in the first address book of the communication apparatus the second transmission destination that is to be used. In this way, the communication apparatus, which uses a transmission destination obtained by referring to an address book in a different apparatus on a network as a transmission destination of electronic data, is capable of registering the obtained transmission destination in an address book of the communication apparatus. Therefore, when using the transmission destination subsequently, as its address book can be referred to, it is possible to save time and effort for communicating with a different apparatus or searching an address book in a different apparatus.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-195379 filed on Oct. 5, 2017, which is hereby incorporated by reference herein in its entirety.

What is claimed is:

1. A communication apparatus capable of communicating with an external apparatus, comprising:
  a memory device that stores a set of instructions; and
  at least one processor that executes the set of instructions to:
    set, as a transmission destination, at least one of first transmission destinations included in a first address book stored on the communication apparatus and second transmission destinations included in a second address book stored on the external apparatus;
    display detail information of the set transmission destination;
    receive an instruction via a registration button to register the transmission destination in the first address book, in a case where at least one of the second transmission destinations is set as the transmission destination and the set transmission destination is usable in the communication apparatus;
    register, according to the received instruction, the set transmission destination in the first address book; and
    transmit electronic data to the set transmission destination,
    wherein, in a case where the set transmission destination is unusable in the communication apparatus, a registration using the registration button is not performed.

2. The communication apparatus according to claim 1, wherein the at least one processor executes instructions in the memory device to: display a setting screen for setting and designating the transmission destination.

3. The communication apparatus according to claim 2, wherein the setting screen includes:
  a first button for obtaining a first destination list from a first external apparatus capable of managing transmission destinations that correspond to all transmission types and displaying a screen for selecting a specific transmission destination from the obtained first destination list; and
  a second button for obtaining a second destination list from a second external apparatus capable of managing transmission destinations that correspond to certain transmission types and displaying a screen for selecting a specific transmission destination from the obtained second destination list.

4. The communication apparatus according to claim 3, wherein the at least one processor executes instructions in the memory device to: when the first button is selected by a user, obtain the first destination list from the first external apparatus via a network and, when the second button is selected by the user, obtain the second destination list from the second external apparatus via the network.

5. The communication apparatus according to claim 3, wherein the second external apparatus is an LDAP (Lightweight Directory Access Protocol) server, and
  the certain transmission types include transmission types that correspond to the transmission destinations of electronic mail and fax.

6. The communication apparatus according to claim 2, wherein the second transmission destinations correspond to all transmission types.

7. The communication apparatus according to claim 3, wherein all transmission types include at least transmission types that correspond to the transmission destinations of electronic mail, fax, Internet fax, and file servers.

8. The communication apparatus according to claim 2, wherein the setting screen selectably displays transmission destinations that have already been set and includes a detail information button for displaying detail information of a selected transmission destination.

9. The communication apparatus according to claim 8, wherein the at least one processor executes instructions in the memory device to:
  when the detail information button of the setting screen is selected by a user, display a detailed information screen that includes the selected transmission destination and the registration button.

10. The communication apparatus according to claim 1, wherein the at least one processor executes instructions in the memory device to:
  determine whether or not a user who uses the communication apparatus has the authority to register a transmission destination in the first address book of the communication apparatus; and
  restrict the registration of the second transmission destination that is to be used in a case where it is determined that the user does not have the authority to register the set transmission destination in the first address book.

11. The communication apparatus according to claim 10, wherein the at least one processor executes instructions in the memory device to:
  determine whether or not the transmission type of the second transmission destination is usable in the communication apparatus; and
  restrict the registration of the second transmission destination that is to be used in a case where it is determined that the transmission type of the second transmission destination is unusable in the communication apparatus.

12. The communication apparatus according to claim 10, wherein the at least one processor executes instructions in the memory device to: convert a parameter included in the second transmission destination to what can be used in the communication apparatus when the second transmission destination is registered.

13. The communication apparatus according to claim 1, wherein the communication apparatus is a multifunction peripheral that includes a scanner; and
wherein the at least one processor executes instructions in the memory device to:
transmit, as the electronic data, data read from a document by the scanner to the transmission destination set by a setting unit.

14. The communication apparatus according to claim 13, wherein the external apparatus is a multifunction peripheral.

15. The communication apparatus according to claim 1, wherein the second address book is publicized on the network.

16. A method for controlling a communication apparatus capable of communicating with an external apparatus, the method comprising:
setting, as a transmission destination, at least one of first transmission destinations included in a first address book stored on the communication apparatus and second transmission destinations included in a second address book stored on the external apparatus;
displaying detail information of the set transmission destination;
receiving an instruction via a registration button to register the transmission destination in the first address book, in a case where at least one of the second transmission destinations is set as the transmission destination and the set transmission destination is usable in the communication apparatus;
registering, according to the received instruction, the set transmission destination in the first address book; and
transmitting electronic data to the set transmission destination,
wherein, in a case where the set transmission destination is unusable in the communication apparatus, a registration using the registration button is not performed.

17. A non-transitory computer-readable storage medium storing a computer program for causing a computer to perform a method for controlling a communication apparatus capable of communicating with an external apparatus, the method comprising:
setting, as a transmission destination, at least one of first transmission destinations included in a first address book stored on the communication apparatus and second transmission destinations included in a second address book stored on the external apparatus;
displaying detail information of the set transmission destination;
receiving an instruction via a registration button to register the transmission destination in the first address book, in a case where at least one of the second transmission destinations is set as the transmission destination and the set transmission destination is usable in the communication apparatus,
registering, according to the received instruction, the set transmission destination in the first address book; and
transmitting electronic data to the set transmission destination,
wherein, in a case where the set transmission destination is unusable in the communication apparatus, a registration using the registration button is not performed.

* * * * *